US011452006B2

(12) United States Patent
Zhang et al.

(10) Patent No.: US 11,452,006 B2
(45) Date of Patent: Sep. 20, 2022

(54) UE BASED FAST RETURN TO 5G

(71) Applicant: QUALCOMM Incorporated, San Diego, CA (US)

(72) Inventors: Juan Zhang, Beijing (CN); Xipeng Zhu, San Diego, CA (US); Haris Zisimopoulos, London (GB); Francesco Pica, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 27 days.

(21) Appl. No.: 17/053,649

(22) PCT Filed: Jul. 26, 2018

(86) PCT No.: PCT/CN2018/097260
§ 371 (c)(1),
(2) Date: Nov. 6, 2020

(87) PCT Pub. No.: WO2019/227642
PCT Pub. Date: Dec. 5, 2019

(65) Prior Publication Data
US 2021/0076264 A1    Mar. 11, 2021

(30) Foreign Application Priority Data

May 28, 2018 (WO) ................ PCT/CN2018/088672

(51) Int. Cl.
*H04W 4/00* (2018.01)
*H04W 36/00* (2009.01)
(Continued)

(52) U.S. Cl.
CPC ... *H04W 36/0022* (2013.01); *H04W 36/0085* (2018.08); *H04W 36/00835* (2018.08); *H04W 60/04* (2013.01); *H04W 76/30* (2018.02)

(58) Field of Classification Search
CPC ............ H04W 36/00; H04W 36/0005; H04W 36/0022; H04W 36/24; H04W 36/34;
(Continued)

(56) References Cited

U.S. PATENT DOCUMENTS

2005/0064891 A1    3/2005  Chaudry et al.
2010/0048210 A1*   2/2010  Iwamura ............... H04W 68/00
                                                              455/436
(Continued)

FOREIGN PATENT DOCUMENTS

CN           104717708 A     6/2015
EP             2717623 A1    4/2014
(Continued)

OTHER PUBLICATIONS

International Search Report and Written Opinion—PCT/CN2018/088672—ISA/EPO—dated Mar. 11, 2019.
(Continued)

*Primary Examiner* — Matthew W Genack
(74) *Attorney, Agent, or Firm* — Qualcomm Incorporated

(57) ABSTRACT

Aspects of the present disclosure provide techniques that allow the user equipment (UE) that initiated single radio voice call continuity (SRVCC) handover during an active voice session from 5G new radio (NR) to 3G legacy system to effectively transition back from 3G legacy systems to 5G NR systems after conclusion of the active voice session. In one example, the UE may override radio resource control (RRC) connection release with evolved universal terrestrial radio access network (E-UTRAN) frequency information that may direct the UE to camp in E-UTRAN cell (LTE cell). In another example, the UE, as a local policy or configuration, may override the UTRAN cell information when the UE is registered in next generation radio access network (NR) cell as 5G capable UE.

28 Claims, 5 Drawing Sheets

(51) Int. Cl.
*H04W 76/30* (2018.01)
*H04W 60/04* (2009.01)

(58) Field of Classification Search
CPC ..... H04W 36/36; H04W 72/00; H04W 72/10; H04W 72/20; H04W 76/27; H04W 76/30; H04W 76/32; H04W 76/34; H04W 76/36
See application file for complete search history.

(56) References Cited

U.S. PATENT DOCUMENTS

| | | | | |
|---|---|---|---|---|
| 2014/0146792 | A1* | 5/2014 | Andre-Jonsson | H04W 36/14 370/331 |
| 2015/0003312 | A1* | 1/2015 | Jeong | H04W 52/0209 370/311 |
| 2015/0327110 | A1* | 11/2015 | Jeong | H04W 28/0226 370/338 |
| 2016/0316310 | A1* | 10/2016 | Ström | H04W 36/02 |
| 2017/0134993 | A1 | 5/2017 | Wang et al. | |
| 2018/0227872 | A1* | 8/2018 | Li | H04W 60/04 |

FOREIGN PATENT DOCUMENTS

| | | |
|---|---|---|
| WO | WO-2015001387 A1 | 1/2015 |
| WO | 2017078601 A1 | 5/2017 |
| WO | 2018065936 A1 | 4/2018 |
| WO | WO-2019226111 A1 | 11/2019 |

OTHER PUBLICATIONS

International Search Report and Written Opinion—PCT/CN2018/097260—ISA/EPO—dated Jan. 18, 2019.
Intel: "New Solution on Returning UE from UTRAN to NG-RAN or E-UTRAN", 3GPP TSG SA WG2 Meeting #127BIS, 3GPP Draft, S2-185172_(WAS 3303)_New_Solution_on_Returning_from_UTRAN V1, 3rd Generation Partnership Project (3GPP), Mobile Competence Centre, 650, Route Des Lucioles, F-06921 Sophia-Antipolis Cedex, vol. SA WG2, No. Newport Beach, U.S, May 28, 2018-Jun. 1, 2018, May 22, 2018 (May 22, 2018), pp. 1-3, XP051535697, Retrieved from the Internet: URL: https://www.3gpp.org/ftp/tsg_sa/WG2_Arch/TSGS2_127BIS_Newport_Beach/Docs/S2-185172.zip, [retrieved on May 22, 2018], Paragraph [0001], Paragraph [Y.X.1.2], Paragraph [Y.X.2].
Supplementary European Search Report—EP18920995—Search Authority—Munich—dated Mar. 4, 2022.
ZTE: "Solution on the Returning to NR after SG SRVCC", SA WG2 Meeting #127bis, 3GPP Draft, S2-185403 Solution on the Returning to NR after SG SRVCC, 3rd Generation Partnership Project (3GPP), Mobile Competence Centre, 650, Route Des Lucioles, F-06921 Sophia-Antipolis Cedex, vol. SA WG2, No. Newport Beach, USA, May 28, 2018-Jun. 1, 2018, May 27, 2018 (May 27, 2018), pp. 1-2, XP051456333, Retrieved from the Internet: URL: https://www.3gpp.org/ftp/tsg_sa/WG2_Arch/TSGS2_127BIS_Newport_Beach/Docs/S2-185403.zip, [retrieved on May 27, 2018], Paragraph [5.3.1].

* cited by examiner

UE BASED FAST RETURN TO 5G

CROSS-REFERENCE TO RELATED APPLICATION

This application is a 35 U.S.C. § 371 National Phase Application of PCT Application No. PCT/CN2018/097260 filed May 28, 2018, entitled "UE BASED FAST RETURN TO 5G," which claims priority to PCT Application No. PCT/CN2018/088672 filed May 28, 2018, entitled "UE BASED FAST RETURN TO 5G." The disclosure of these prior applications are hereby incorporated by reference herein in their entirety.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, long term evolution (LTE) and 5G new radio (NR) communications technology expand and support diverse usage scenarios and applications with respect to current mobile network generations. In an aspect, wireless communications technology includes enhanced mobile broadband addressing human-centric use cases for access to multimedia content, services and data; ultra-reliable-low latency communications (URLLC) with strict requirements, especially in terms of latency and reliability; and massive machine type communications for a very large number of connected devices and typically transmitting a relatively low volume of non-delay-sensitive information.

With the deployment of 5G NR communication technology, there still exists a need for configuring user equipments (UEs) to dynamically adapt between multiple hybrid systems, including legacy systems. For example, during an active voice session in IP Multimedia Subsystem (IMS), the UE may move out of a 5G NR cell coverage area that support voice over new radio (VoNR) to areas without 5G coverage. In such instances, the active voice session may be handed over to legacy systems such as 2G, 3G cells using single radio voice call continuity (SRVCC) handover. Currently, however, the UE at the conclusion of the voice session may camp (or stay) with the legacy system even when the 5G NR cell coverage is again available because currently legacy systems are not equipped to notify the UEs of the 5G frequency availabilities.

SUMMARY

Aspects of the present disclosure provide techniques that allow the UE that initiated SRVCC handover during an active voice session from 5G NR, to legacy cell (e.g., UTRAN, GSM, CDMA2000, etc.) to effectively transition back from legacy cell to 5G NR cells after conclusion of the active voice session without the need to first camp on the legacy cells UTRAN, GSM, or CDMA2000) or an intermediate cell (e.g., evolved universal terrestrial radio access network (E-UTRAN) or LTE). Features of the present disclosure achieve this by overriding at least one procedure associated with the radio resource control (RRC) release message.

In one example, a method for wireless communication is disclosed. The method may include determining, at a UE, that a voice call over a legacy cell (e.g., UTRAN, GSM, CDMA2000 cell) has terminated. The voice call may have originally been handed over to the legacy cell from a NR cell based on a SRVCC trigger. The method may further include receiving, from a legacy cell, a radio resource control (RRC) release message in response to the termination of the voice call. The method may further include selecting, in response to the RRC release message, a NR cell for communication without camping on either the legacy cell or an intermediate cell after the voice call has terminated. In some examples, selecting the NR cell includes overriding at least one procedure associated with the RRC release message. The method further include establishing communication with the NR cell based on the selection.

In another example, an apparatus for wireless communications is disclosed. The apparatus may include a memory configured to store instructions, and a processor communicatively coupled with the memory. The processor may be configured to execute the instructions to determine, at a UE, that a voice call over legacy cell has terminated. The voice call may have originally been handed over to the legacy from a NR cell based on a SRVCC trigger. The instructions may further be executed by the processor to receive, from a legacy cell, a radio resource control (RRC) release message in response to the termination of the voice call. The instructions may further be executed by the processor to select, in response to the RRC release message, a NR cell for communication without camping on either the legacy cell or an intermediate cell after the voice call has terminated. In some examples, selecting the NR cell includes overriding at least one procedure associated with the RRC release message. The instructions may further be executed by the processor to establish communication with the NR cell based on the selection.

In another example, a computer readable medium for wireless communications is disclosed. The computer readable medium may include code for determining, at a UE, that a voice call over legacy cell has terminated. The voice call may have originally been handed over to the legacy from a NR cell based on a SRVCC trigger. The computer readable medium may further include code for receiving, from a legacy cell, a radio resource control (RRC) release message in response to the termination of the voice call. The computer readable medium may further include code for selecting, in response to the RRC release message, a NR cell for communication without camping on either the legacy cell or an intermediate cell after the voice call has terminated. In some examples, the code for selecting the NR cell includes overriding at least one procedure associated with the RRC release message. The computer readable medium may further include code for establishing communication with the NR cell based on the selection.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
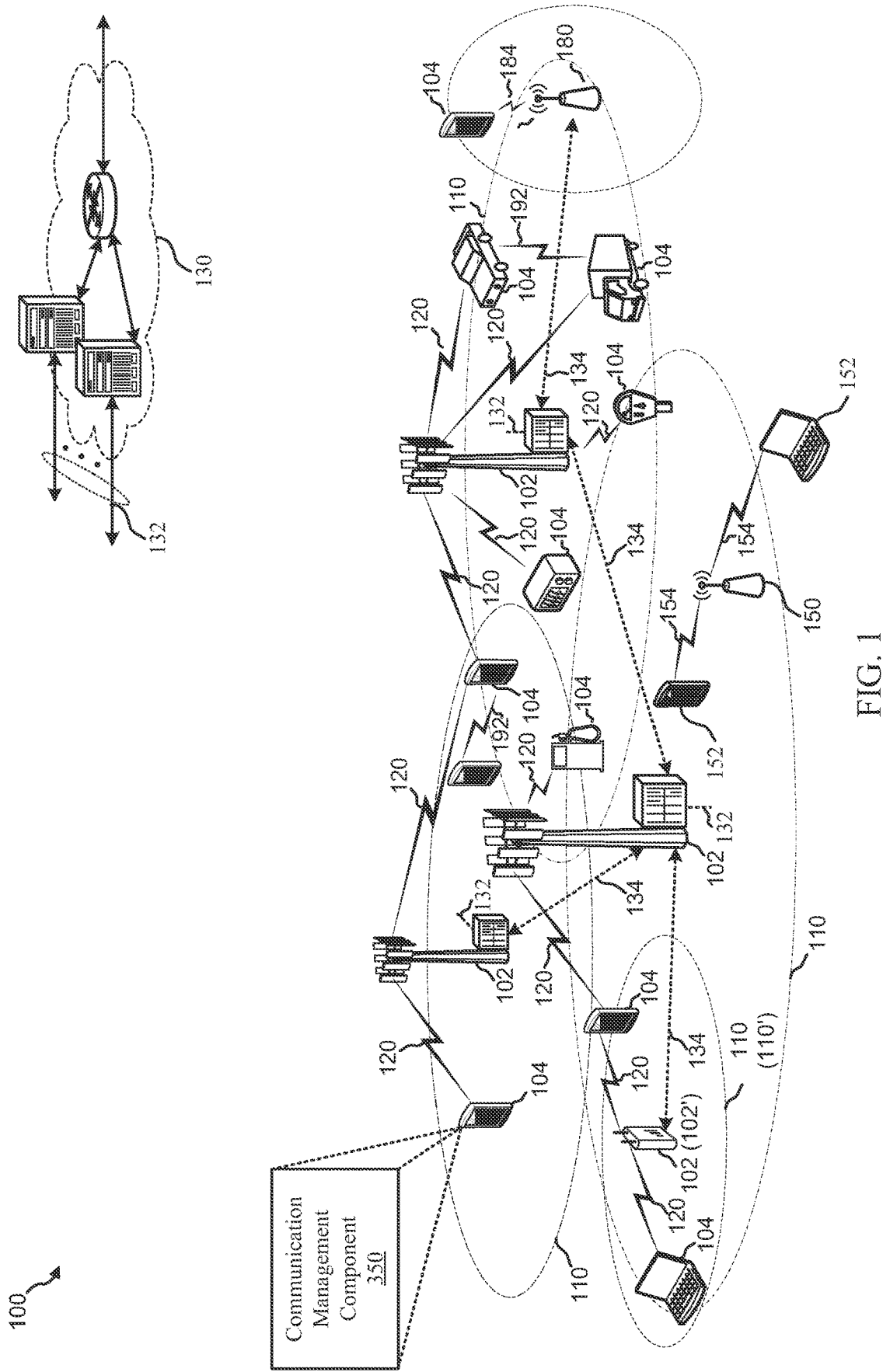
FIG. 1 illustrates an example of a wireless communications system in accordance with aspects of the present disclosure.

As discussed above, during an active voice session in IP Multimedia Subsystem (IMS), the UE may move out of a 5G NR (or NR cell) cell coverage area that support voice over new radio (VoNR) to areas without 5G coverage. In such instances, the active voice session may be handed over to legacy cells using single radio voice call continuity (SRVCC) handover. For purposes of this disclosure, the term "legacy cell" may refer to wireless communication networks and corresponding base stations that support technology that predates NR such as GSM, 2G, 3G, LTE, CDMA2000 etc. Currently, however, the UE at the conclusion of the voice session may camp (or stay) with the legacy cell even when the 5G NR cell coverage is again available because currently legacy systems are not equipped to notify the UEs of the 5G frequency availabilities, Specifically, the conventional return mechanism from UTRAN/GSM to E-UTRAN includes the RNC including E-UTRAN target information in RRC release message such that the UE may select the E-UTRAN cell according to the Evolved-UTRA Absolute Radio Frequency No (EARFCN) information included the RRC release message. Currently, however, there does not exist any mechanism to return the UE from UTRAN/GSM to the NR, at the conclusion of a voice session, without modifying the legacy network architecture (e.g., requiring the UTRAN network to notify the UE of the 5G cell information). Modifying the legacy network architecture and requirements may not be ideal because transmission requirements may impact legacy UTRAN/GERAN systems. For example, UEs and base stations that are communicating exclusively on legacy systems may not be able to process unfamiliar packets that may include NR cell information from UTRAN/GERAN cell.

One potential workaround the above problem that is currently considered include having the UE transition from the UTRAN/GSM to E-UTRAN (LTE) prior to returning back to NR (5G). In such instance, after the conclusion of the voice call over the UTRAN/GSM where the voice session was handed over from a NR due to SRVCC trigger, the RNC may transmit a RRC release message to the UE. In some examples, RRC release message may RRC redirect information from the network that identifies E-UTRAN frequency information for the UE. Based on receiving the E-UTRAN frequency information, the UE may search E-UTRAN cells and perform E-UTRAN cell measurements. Further, the UE may read the E-UTRAN cell SIB information and thereby camp on the E-UTRAN cell. Once the UE is camped on the E-UTRAN cell the UE initiates tracking area update (TAU) procedure. Based on the completion of the TAU, the RNC may transmit a RRC redirect or handover message to the UE to transition the UE from E-UTRAN to the NR. Thereafter, the UE may initiate NR cell measurements and establish communication with the NR cell after analyzing the NR cell SIB information and attaching to the NR cell.

In other examples, the RRC release message may lack the RRC redirect information from the network. In such situations, the UE, based on the RRC release message, may enter UTRAN/GERAN RRC idle state and camp on UTRAN or GERAN cells to read UTRAN/GERAN SIB information to identify neighboring LTE cells. Based on the neighboring LTE cell information obtained from the UTRAN/GERAN SIB, the UE may initiate measuring the frequencies associated with the neighboring LTE cells to identify cells that may provide strongest signal. Thereafter, the UE may select LTE and camp on the LTE prior to again searching for and establishing communication with NR cells.

Both of above workarounds, however, may not be efficient because it requires the UE to first camp on the legacy cell (e.g., UTRAN, GSM, CDMA2000) or intermediate cell (e.g., E-UTRAN cell) and initiate the TAU procedure before being redirected to the NR cell.

Aspects of the present disclosure provide techniques that allow the UE that initiated SRVCC handover during an active voice session from 5G NR to legacy system (e.g., UTRAN or GSM) to effectively transition back from legacy systems to NR cell after conclusion of the active voice session without requiring the UE to first camp on the legacy cell (e.g., UTRAN, GSM, CDMA2000) or an intermediate cell (e.g., E-UTRAN cell) after the conclusion of the voice call. Instead, the UE may initiate the TAU procedure for redirect to the NR cell. In one example, the UE may override (or ignore/skip) at least one procedure associated with the RRC release message. For example, in the instance of RRC release without RRC redirect, the UE may ignore the procedures associated with the RRC release message that may include generally requiring the UE to enter an RRC idle state and camp on either a UTRAN/GERAN cell after receiving the RRC release message. In such situations, the HE may generally camp on the UTRAN/GERAN cell would read UTRAN/GERAN system information block (SIB) to identify one or more neighboring evolved universal terrestrial radio access network (E-UTRAN) cells. However, in accordance with aspects of the present disclosure, the UE may override at least one procedure associated with the RRC release message and proceed directly to measuring NR frequencies to identify neighboring NR cells and selecting NR cell to camp on based on the NR frequency measurements.

In other examples, where the RRC release message includes a RRC redirect information (e.g., LTE frequency, cell information), overriding at least one procedure associated with the RRC may include the UE foregoing first camping on the UTRAN or E-UTRAN cell. Instead, the UE may directly analyze the one or both of the cell or frequency information associated with the E-UTRAN cell to determine whether there is at least one NR cell near the E-UTRAN cell. In such instance, the UE may select the NR cell for communication based on the NR frequency measurements.

Whether the at least one procedure associated with the RRC release message is overridden by the UE may be based on policy or configuration that may be either preconfigured to the UE or provided by the network. In some examples, the policy or the configuration information association with the UE is received by the HE based on the UE registration with the NR cell by non-access stratum (NAS) message during registration procedure. In other examples, the policy or the configuration information association with the UE is received via Open Mobile Alliance (OMA) Device Management (DM) in the NR cell. In yet another example, the policy or the configuration information association with the UE is based on a static configuration. In another example, the UE, as a local policy or configuration, may override the UTRAN cell information when the UE is registered in NR cell as 5G capable UE.

Thus, in accordance with one technique of the present disclosure to transition the UE from the legacy cell (e.g., UTRAN or GSM) back to NR cell may include the radio network controller (RNC) including the E-UTRAN frequency information in redirection in the RRC release message. Upon receiving the E-UTRAN frequency information, the UE may search the E-UTRAN cell and perform E-UTRAN cell measurements. In some examples, the UE may override the RRC connection release of E-UTRAN frequency information instructing the UE to camp in E-UTRAN cell with NR cell. Specifically, instead of camping on the E-UTRAN cell, the UE may analyze the E-UTRAN cell system information block (SIB) information to determine whether there is a neighbor NR cell near the E-UTRAN cell. If there is a neighbor NR cell, the UE may select the NR cell. If, however, there are multiple NR neighbor cells or frequencies, the UE may access the NR-RAN cell with the highest priority. Thus, in some aspects, the E-UTRAN SIB information may include the priority information for NR neighbors. By overriding the E-UTRAN frequency information instructing the UE to camp in E-UTRAN cell with NR cell information, the UE may avoid camping on the E-UTRAN cell and thus minimize any delay in returning from UTRAN/GSM to NR cell.

Once the UE overrides the E-UTRAN frequency information with NR cell information, the UE may search the NR cell according to the E-UTRAN SIB information and perform NR cell measurement prior to camping and attaching on NR cell. In order to attaching to the NR cell, the UE may initiate initial registration procedure in the NR cell.

In accordance with another technique of the present disclosure to transition the UE from the UTRAN/GSM cell back to NR cell may include the radio network controller (RNC) omitting the E-UTRAN frequency information from the RRC release message. Absent the E-UTRAN frequency information (such as in the first technique), the UE may not override the E-UTRAN frequency information. Instead, in the second technique, following the conclusion of the voice session at the UTRAN, where the voice call was handed over to the UTRAN from the NR cell, the RNC may transmit the RRC redirection message that fails to include E-UTRAN frequency information. Accordingly, the UE may search the camped UTRAN cell according to the established local policies and configurations of the UE. The local policies and configurations of the UE may be established by the network or be preconfigured. In case of the policies being established by the network, the policies may be based on the UE's registration with NR cell prior to handover to the UTRAN. Specifically, during an initial registration with the NR cell (e.g., prior to initializing the voice session and handover), the network may transmit policy or configuration information to the UE indicating to UE to override the UTRAN cell information in order to return from UTRAN to NR cell. In some aspects, the policy or configuration information may be transmitted by the network to the UE via NAS message during the registration procedure or the policy may be send from PCC to UE after the UE registers with NR cell. Based on the policy and configuration information, the UE may elect to override the UTRAN cell information with NR cell information provided in the policy information received from NR cell during initial registration. The UE may utilize the NR cell information to reattach to the NR cell when the voice call is terminated over UTRAN after first being handed over from NR due to SRVCC.

Various aspects are now described in more detail with reference to the FIGS. 1-4. In the following description, for purposes of explanation, numerous specific details are set forth in order to provide a thorough understanding of one or more aspects. It may be evident, however, that such aspect(s) may be practiced without these specific details. Additionally, the term "component" as used herein may be one of the parts that make up a system, may be hardware, firmware, and/or software stored on a computer-readable medium, and may be divided into other components.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC). In some examples, the wireless communications system may also include the core network 130 that may provide user authentication, access authorization, tracking, internet protocol (IP) connectivity, and other access, routing, or mobility functions. The core network 130 may allow circuit-switched connectivity to the back-end operator network (e.g., public land mobile network (PLMN) and/or packet-switched connectivity to private networks, operator's intranet or to the public internet.

It should be noted that the techniques described here may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1×, 1×, etc. 1S-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UNITS), 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to 5G networks or other next generation communication systems).

The base stations 102 may include macro cells (high power cellular base station) and/or small cell base stations (low power cellular base station)). The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell base station 102' may have a coverage area 110' that overlaps the coverage area 110 of one or more macro cell base stations 102. A network that includes both small cell base stations and macro cell base stations may be known as a heterogeneous network. A heterogeneous network may also include Home Evolved Node Base Stations (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 192. The D2D communication link 192 may use the DL/UL WWAN spectrum. The D2D communication link 192 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAB) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell base station 102' may operate in a licensed and/or an unlicensed frequency spectrum. When operating in an unlicensed frequency spectrum, the small cell base station 102' may employ NR and use the same 5 GHz unlicensed frequency spectrum as used by the Wi-Fi AP 150. The small cell base station 102', employing NR in an unlicensed frequency spectrum, may boost coverage to and/or increase capacity of the access network.

A gNodeB (gNB) or eNodeB (eNB) 180 (one or both of gNB and eNB may also be referred to as "base station") may operate in millimeter wave (mmW) frequencies and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. It should be appreciated by those of ordinary skill in the art that the present invention is not just limited to mmW, but may also include any other frequencies used for wireless communication. Radio waves in the band may be referred to as a millimeter wave. Near mmW may extend down to a frequency of 3 (3 Hz with a wavelength of 100 millimeters. The super high frequency (SHF) band extends between 3 GHz and 30 GHz, also referred to as centimeter wave. Communications using the mmW/near mmW radio frequency band has extremely high path loss and a short range. In an aspect, a gNB 180 operating using mmW may utilize beamforming 184 with the UE 104 to compensate for the extremely high path loss and short range. Additionally, UEs 104 performing D2D communications may operate using mmW and may also utilize beamforming 184.

The EPC may include a Mobility Management Entity (MME), other MMEs 164, a Serving Gateway, a Multimedia Broadcast Multicast Service (MBMS) Gateway 168, a Broadcast Multicast Service Center (BM-SC), and a Packet Data Network (PDN) Gateway. The MME may be in communication with a Home Subscriber Server (HSS) 174. The MME is the control node that processes the signaling between the UEs 104 and the EPC. Generally, the MME provides bearer and connection management. All user Internet protocol (IP) packets are transferred through the Serving Gateway, which itself is connected to the PDN Gateway. The PDN Gateway provides UE IP address allocation as well as other functions. The PDN Gateway 172 and the BM-SC are connected to the IP Services. The IP Services may include the Internet, an intranet, an IP Multimedia Subsystem (IMS), a PS Streaming Service, and/or other IP services. The BM-SC may provide functions for MBMS user service provisioning and delivery. The BM-SC may serve as an entry point for content provider MBMS transmission, may be used to authorize and initiate MBMS Bearer Services within a public land mobile network (PLMN), and may be used to schedule MBMS transmissions. The MBMS Gateway may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In some examples, the wireless communication system may be a mmW communication system. In mmW communication systems (e.g., access network 100), a line of sight (LOS) may be needed between a transmitting device (e.g., base station 102) and a receiving device (e.g., UE 104), or between two UEs 104. Frequency is very high in mmW communication systems which means that beam widths are very small, as the beam widths are inversely proportional to the frequency of the waves or carriers transmitted by an antenna of the transmitting device. Beam widths used in mmW communications are often termed as "pencil beams." The small wavelengths may result in many objects or materials acting as obstacles including even oxygen molecules. Therefore, LOS between the transmitter and receiver may be required unless a reflected path is strong enough to transmit data. Further, in some examples, base stations may track UEs 104 to focus beams for communication.

During LOS situations, tracking of the UE 104 may be performed by the base station 102 or another UE 104 by focusing a beam onto the tracked LTE 104. However, if the receiving UE 104 is in a Non-Line of Sight (NLOS) position, then a transmitter of the base station 102 may need to search for a strong reflected path which is not always available. An example of a UE 104 being in a NLOS position may include a first UE 104 located within a vehicle. When the first UE 104 is located within the vehicle, a base station 102 may have difficulty retaining LOS and the difficulty of retaining LOS may further increase when the vehicle is moving.

Further, compared to lower frequency communication systems, a distance between base stations 102 in a mmW communication system may be very short (e.g., 150-200 meters between gNBs). The short distances may result in a short amount of time required for a handover between base stations 102. The short distance and the fast handovers may cause difficulty to the base station 102 in maintaining a LOS beam on a UE 104 when the UE 104 is, for example, located within a vehicle as even small obstacles like a user's finger on the UE 104 or the vehicle windows or windshield act as obstacles to maintaining the LOS.

One way to overcome LOS issues is by using CV2X technologies. In CV2X technology, a vehicle can communicate with at least one of one or more cellular networks, one or more vehicles, and/or one or more cellular configured devices. To communicate with other devices the CV2X technology may use antennas that are compatible with mmW communication systems.

In certain aspects, one or more UEs 104 may be configured for CV2X communications between UEs 104. The UEs 104 may include various devices related to vehicles and transportation. For example, the UEs 104 may include vehicles, devices within vehicles, and transportation infrastructure such as roadside devices, tolling stations, fuel supplies, or any other device that that may communicate with a vehicle. A UE 104 may act as either a host device or a client device for CV2X communication. A host UE 104 may advertise CV2X services supported by the host UE 104. A client UE 104 may discover CV2X services supported by the host UE 104. Moreover, a UE 104 may act as both a host and a client. For example, a vehicle may act as a host to provide speed and braking updates to surrounding vehicles and act as a client to communicate with a tolling station. Accordingly, a single UE 104 may include both a host discovery component and a client discovery component.

Figure 2A:
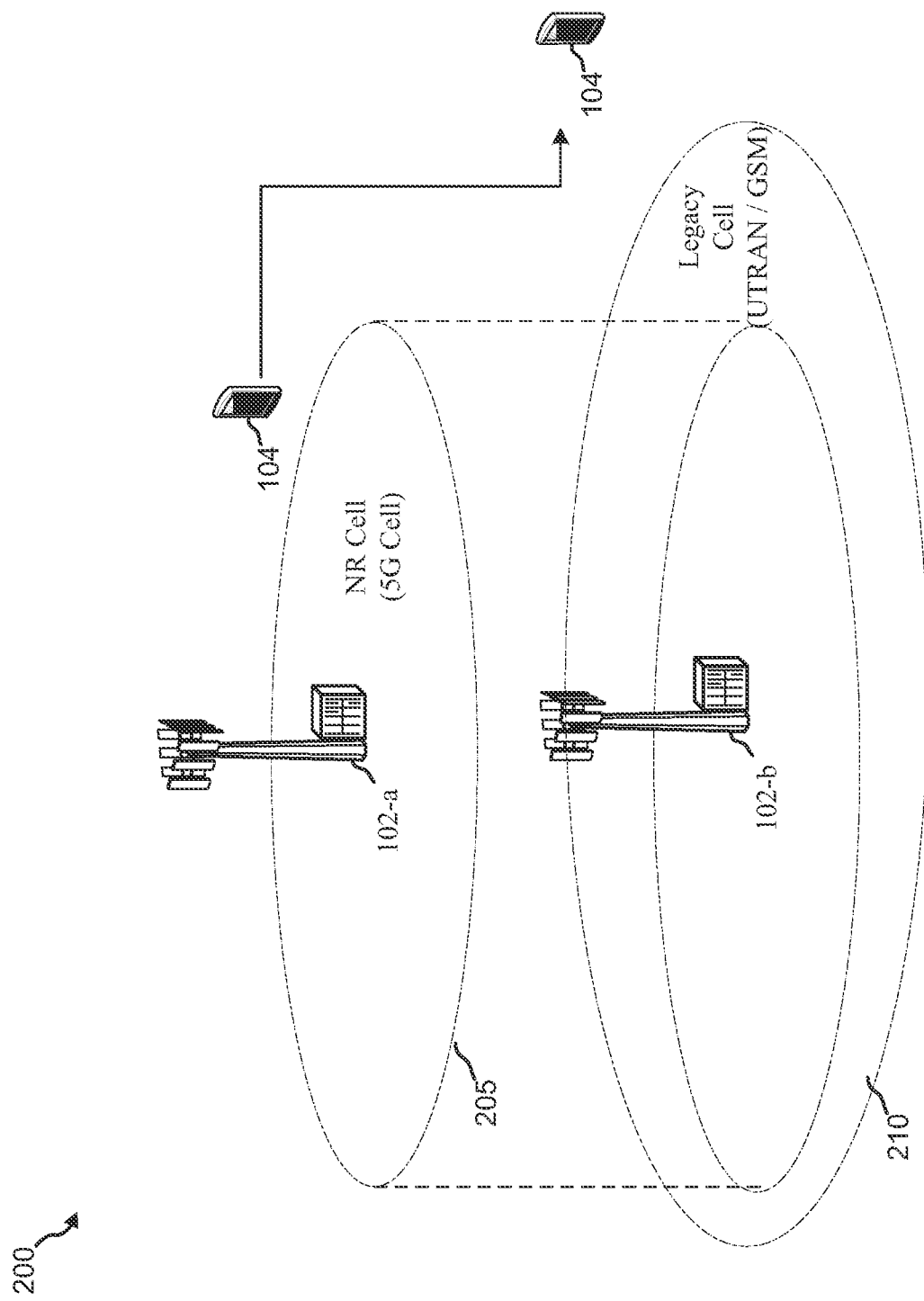
FIG. 2A illustrates an example of the wireless communications system where the UE may transition from the NR cell to UTRAN cell based on SRVCC trigger in accordance with aspects of the present disclosure.

FIG. 2A illustrates an example of the wireless communications system 200 where the UE 104 may transition from the NR cell 205 implemented by NR base station 102-a to legacy cell 210 (e.g., UTRAN or GSM) implemented by legacy base station 102-b based on SRVCC trigger in accordance with aspects of the present disclosure. In some examples, the NR cell 205 may have a shorter coverage area than the legacy cell 210.

If, during a voice call previously started in the NR cell 205 (e.g., VoNR or IMS full voice), the UE 104 moves outside the coverage area of the NR cell 205, the UE 104 may initiate SRVCC in order to maintain the continuity of the active voice call. During the SRVCC procedure, the context of an active voice call on the IMS may be transferred to the CS legacy network (e.g., IMS node context transfer to the MSC).

Figure 2B:
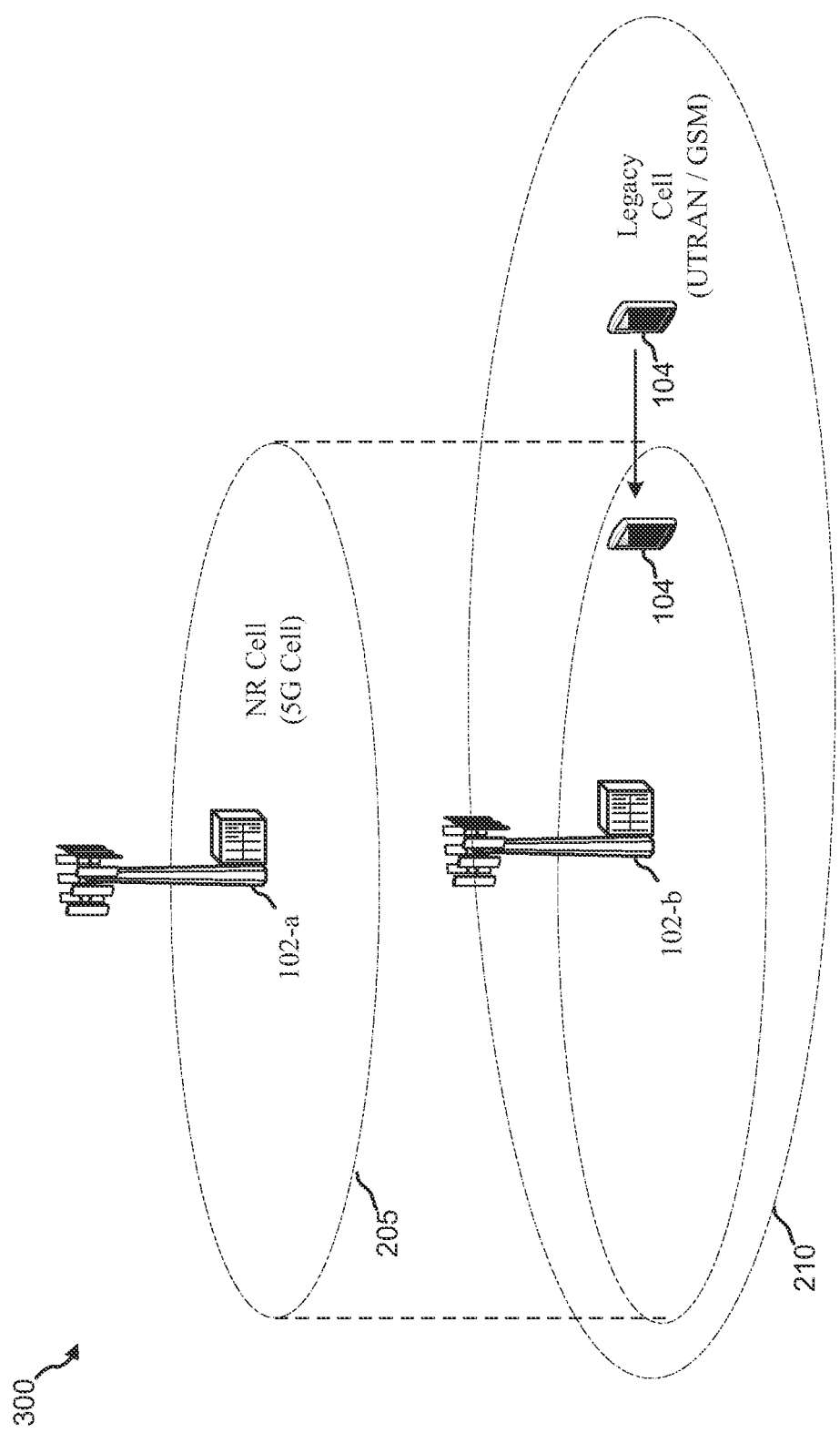
FIG. 2B illustrates an example of the wireless communications system where the UE may transition back from the UTRAN cell to the NRNR cell upon completion of the voice session in accordance with aspects of the present disclosure.

However, as illustrated in FIG. 2B, generally the UE at the conclusion of the voice session may camp (or stay) with the legacy cell 210 (e.g., UTRAN or GSM) even when the NR Cell 205 NR cell coverage 205 is again available. For example, after the voice call may have transitioned to the legacy cell 210, the UE 104 may move back within the coverage area of the NR cell 205. However, in traditional systems, the UE 104 may continue to camp at the legacy cell 210 (e.g., UTRAN or GSM) or connect to E-UTRAN cell (not shown) based on E-UTRAN SIB information received from the legacy base station 102-*b* prior to returning to NR cell 205. Features of the present disclosure minimize the delay the UE 104 may experience in returning from legacy cell 210 to NR cell 205 at the conclusion of a voice session when the session was handed over based on SRVCC trigger.

To this end, in accordance with first technique of the present disclosure to transition the UE 104 from the legacy cell 210 that may be UTRAN cell or GSM cell back to NR cell 205 may include the RNC including the E-UTRAN frequency information in redirection in the RRC release message. Upon receiving the E-UTRAN frequency information, the UE 104 may search the E-UTRAN cell and perform E-UTRAN cell measurements. In some examples, the UE 104 may override the RRC connection release of E-UTRAN frequency information instructing the UE 104 to camp in E-UTRAN cell with NR cell 205. Specifically, instead of camping on the E-UTRAN cell (not shown), the UE 104 may analyze the E-UTRAN cell system information block (SIB) information to determine whether there is a neighbor NR cell 205 near the E-UTRAN cell. If there is a neighbor NR cell, the UE may select the NR cell. If, however, there are multiple NR neighbor cells or frequencies, the UE may access the NR-RAN cell with the highest priority. Thus, in some aspects, the E-UTRAN SIB information may include the priority information for NR neighbors. By overriding the E-UTRAN frequency information instructing the UE to camp in E-UTRAN cell with NR cell information, the UE 104 may avoid camping on the E-UTRAN cell and thus minimize any delay in returning from UTRAN to NR cell.

Once the UE 104 overrides the E-UTRAN frequency information with NR cell information, the UE may search the NR cell according to the E-UTRAN SIB information and perform NR cell measurement prior to camping and attaching in NR cell. In order to attach to the NR cell, the UE may initiate initial registration procedure with the NR cell.

Similarly, for the UEs 104 that may transition to GSM during the voice call based on SRVCC, the GERAN may move the UE to UTRAN by RRC redirection or cell change order (CCO). The UE may derive the NR frequency information from target E-UTRAN frequency/cell information provided by the GERAN and identify the NR frequencies and cells from E-UTRAN system information. Accordingly, the UE may override the redirection/CCO and select the NR cell.

In accordance with second technique of the present disclosure to transition the UE 104 from the UTRAN cell 210 back to NR cell 205 may include the RNC omitting the E-UTRAN frequency information from the RRC release message. Accordingly, the UE may search the camped NR cell according to the established local policies and configurations of the UE. The local policies and configurations of the UE may be established by the network or be preconfigured. In case of the policies being established by the network, the policies may be based on the UE's registration with NR cell prior to handover to the UTRAN. Specifically, during an initial registration with the NR cell prior to initializing the voice session and handover), the network may transmit policy or configuration information to the UE indicating to UE prior to selecting an NR cell when UE is in UTRAN cell in IDLE mode. In some aspects, the policy or configuration information may be transmitted by the network to the UE via NAS message during the registration procedure or the policy may be send from PCC to UE after the UE registers with NR cell. Based on the policy and configuration information, the UE may select a NR cell when the voice call is terminated over UTRAN. The UE may utilize the NR cell information to reattach to the NR cell when the voice call is terminated over UTRAN after first being handed over from NR due to SRVCC.

In another example, with respect to the transitioning from the GSM back to the NR, the GSM may release the UE to idle state such that UE may skip GERAN camping and select the NR cell directly. Accordingly, the UE may establish communication with the NR cell based on the selection. In some examples, the configuration policy of transitioning may be configured by the NAS or OMA DM or OEM static configuration. The policy may be configured as PLMN specific where the overriding policy for GSM to NR and UTRAN to NR may or may not be different.

Figure 3:
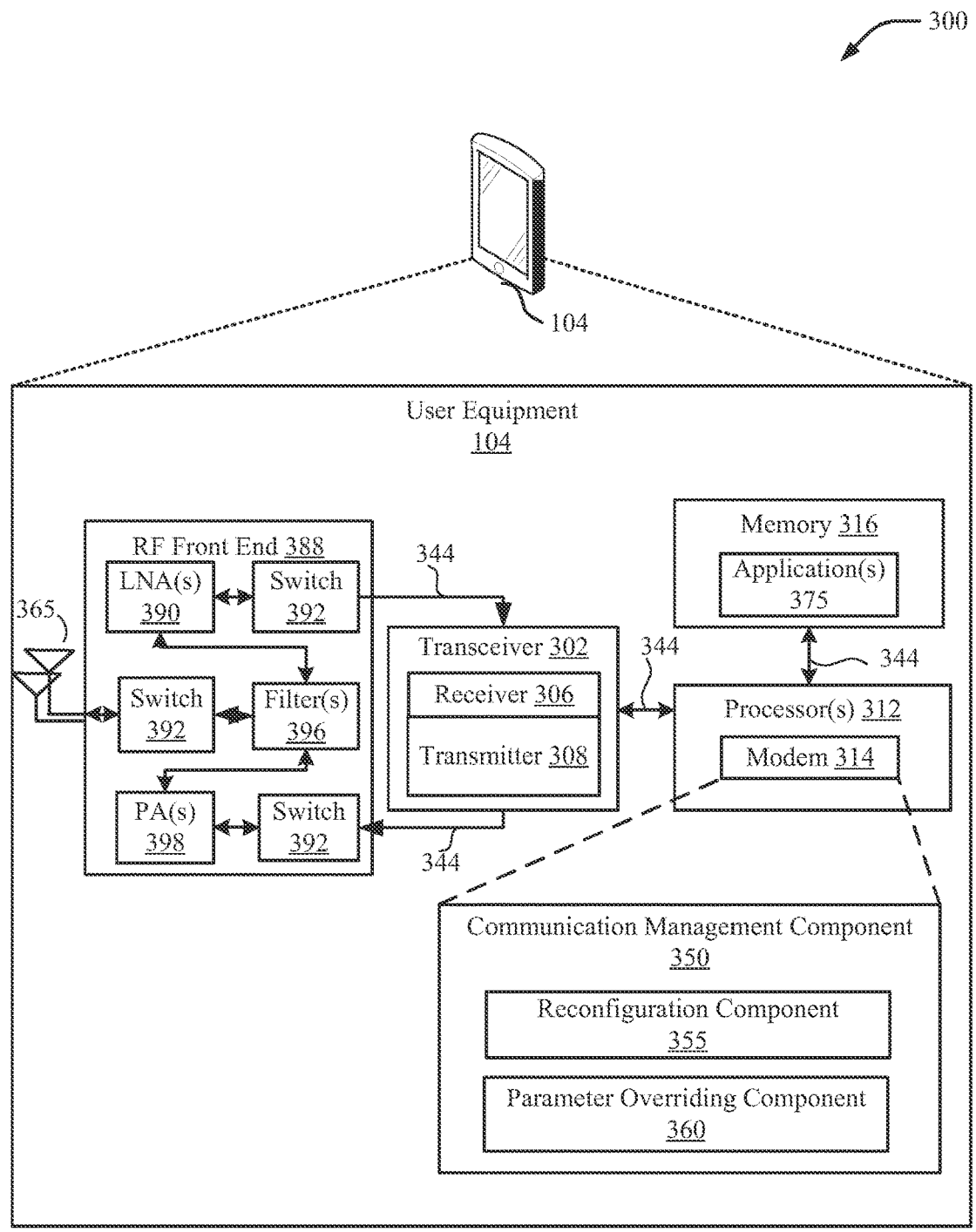
FIG. 3 illustrates an example of a schematic diagram of an aspect of an implementation of various components of a UE in accordance with various aspects of the present disclosure.

FIG. 3 illustrates a hardware components and subcomponents of a device that may be a UE 104 for implementing one or more methods (e.g., method 400) described herein in accordance with various aspects of the present disclosure. For example, one example of an implementation of the UE 104 may include a variety of components, some of which have already been described above, but including components such as one or more processors 312, memory 316 and transceiver 302 in communication via one or more buses 344, which may operate in conjunction with the communication management component 350 to perform functions described herein related to including one or more methods (e.g., 400) of the present disclosure.

The one or more processors 312, modem 314, memory 316, transceiver 302, RF front end 388 and one or more antennas 365, may be configured to support voice and/or data calls (simultaneously or non-simultaneously) in one or more radio access technologies. In an aspect, the one or more processors 312 can include a modem 314 that uses one or more modem processors. The various functions related to communication management component 350 may be included in modem 314 and/or processors 312 and, in an aspect, can be executed by a single processor, while in other aspects, different ones of the functions may be executed by a combination of two or more different processors. For example, in an aspect, the one or more processors 312 may include any one or any combination of a modem processor, or a baseband processor, or a digital signal processor, or a transmit processor, or a receiver processor, or a transceiver processor associated with transceiver 302. In other aspects, some of the features of the one or more processors 312 and/or modem 314 associated with communication management component 350 may be performed by transceiver 302.

The memory 316 may be configured to store data used herein and/or local versions of application(s) 375 or communication management component 350 and/or one or more of its subcomponents being executed by at least one processor 312. The memory 316 can include any type of computer-readable medium usable by a computer or at least one processor 312, such as random access memory (RAM), read only memory (ROM), tapes, magnetic discs, optical discs, volatile memory, non-volatile memory, and any combination thereof. In an aspect, for example, the memory 316 may be a non-transitory computer-readable storage medium that stores one or more computer-executable codes defining communication management component 350 and/or one or more of its subcomponents, and/or data associated therewith, when the UE 104 is operating at least one processor 312 to execute communication management component 350 and/or one or more of its subcomponents. The communication management component 350 may include a reconfiguration component 355 and the parameter override component 360 to enable the UE to transition back to NR cell after the termination of a call at the UTRAN.

Specifically, the communication management component 350 may implement techniques that allow the UE 104 that initiated SRVCC handover during an active voice session from 5G NR to 3G legacy system to effectively transition back from legacy systems UTRAN cell to NR cell after conclusion of the active voice session without requiring the UE to first camp on the E-UTRAN cell and initiate the TAU procedure for redirect to the NR cell. In one example, the UE 104 may override RRC connection release with evolved universal terrestrial radio access network (E-UTRAN) frequency information that may direct the UE to camp in E-UTRAN cell. In another example, the UE, as a local policy or configuration, may override the UTRAN cell information when the UE is registered in NR cell as 5G capable UE.

The transceiver 302 may include at least one receiver 306 and at least one transmitter 308. The receiver 306 may include hardware, firmware, and/or software code executable by a processor for receiving data, the code comprising instructions and being stored in a memory (e.g., computer-readable medium). The receiver 306 may be, for example, a radio frequency (RF) receiver. In an aspect, the receiver 306 may receive signals transmitted by at least one UE 104. Additionally, receiver 306 may process such received signals, and also may obtain measurements of the signals, such as, but not limited to, Ec/Io, SNR, RSRP, RSSI, etc. The transmitter 308 may include hardware, firmware, and/or software code executable by a processor for transmitting data, the code comprising instructions and being stored in a memory (e.g., computer-readable medium). A suitable example of the transmitter 308 may including, but is not limited to, an RF transmitter.

Moreover, in an aspect, transmitting device may include the RF front end 388, which may operate in communication with one or more antennas 365 and transceiver 302 for receiving and transmitting radio transmissions, for example, wireless communications transmitted by at least one base station 102 or wireless transmissions transmitted by UE 104. The RF front end 388 may be connected to one or more antennas 365 and can include one or more low-noise amplifiers (LNAs) 390, one or more switches 392, one or more power amplifiers (PAs) 398, and one or more filters 396 for transmitting and receiving RF signals.

In an aspect, the LNA 390 can amplify a received signal at a desired output level. In an aspect, each LNA 390 may have a specified minimum and maximum gain values. In an aspect, the RF front end 388 may use one or more switches 392 to select a particular LNA 390 and its specified gain value based on a desired gain value for a particular application.

Further, for example, one or more PA(s) 398 may be used by the RF front end 388 to amplify a signal for an RF output at a desired output power level. In an aspect, each PA 398 may have specified minimum and maximum gain values. In an aspect, the RF front end 388 may use one or more switches 392 to select a particular PA 398 and its specified gain value based on a desired gain value for a particular application.

Also, for example, one or more filters 396 can be used by the RF front end 388 to filter a received signal to obtain an input RF signal. Similarly, in an aspect, for example, a respective filter 396 can be used to filter an output from a respective PA 398 to produce an output signal for transmission. In an aspect, each filter 396 can be connected to a specific LNA 390 and/or PA 398. In an aspect, the RF front end 388 can use one or more switches 392 to select a transmit or receive path using a specified filter 396, LNA 390, and/or PA 398, based on a configuration as specified by the transceiver 302 and/or processor 312.

As such, the transceiver 302 may be configured to transmit and receive wireless signals through one or more antennas 365 via the RF front end 388. In an aspect, the transceiver 302 may be tuned to operate at specified frequencies such that transmitting device can communicate with, for example, one or more base stations 102 or one or more cells associated with one or more base stations 102. In an aspect, for example, the modem 314 can configure the transceiver 302 to operate at a specified frequency and power level based on the configuration of the transmitting device and the communication protocol used by the modem 314.

In an aspect, the modem 314 can be a multiband-multi-mode modem, which can process digital data and communicate with the transceiver 302 such that the digital data is sent and received using the transceiver 302. In an aspect, the modem 314 can be multiband and be configured to support multiple frequency bands for a specific communications protocol. In an aspect, the modem 314 can be multimode and be configured to support multiple operating networks and communications protocols. In an aspect, the modem 314 can control one or more components of transmitting device (e.g., RF front end 388, transceiver 302) to enable transmission and/or reception of signals from the network based on a specified modem configuration. In an aspect, the modem configuration can be based on the mode of the modem 314 and the frequency band in use. In another aspect, the modem configuration can be based on UE configuration information associated with transmitting device as provided by the network during cell selection and/or cell reselection.

Figure 4:
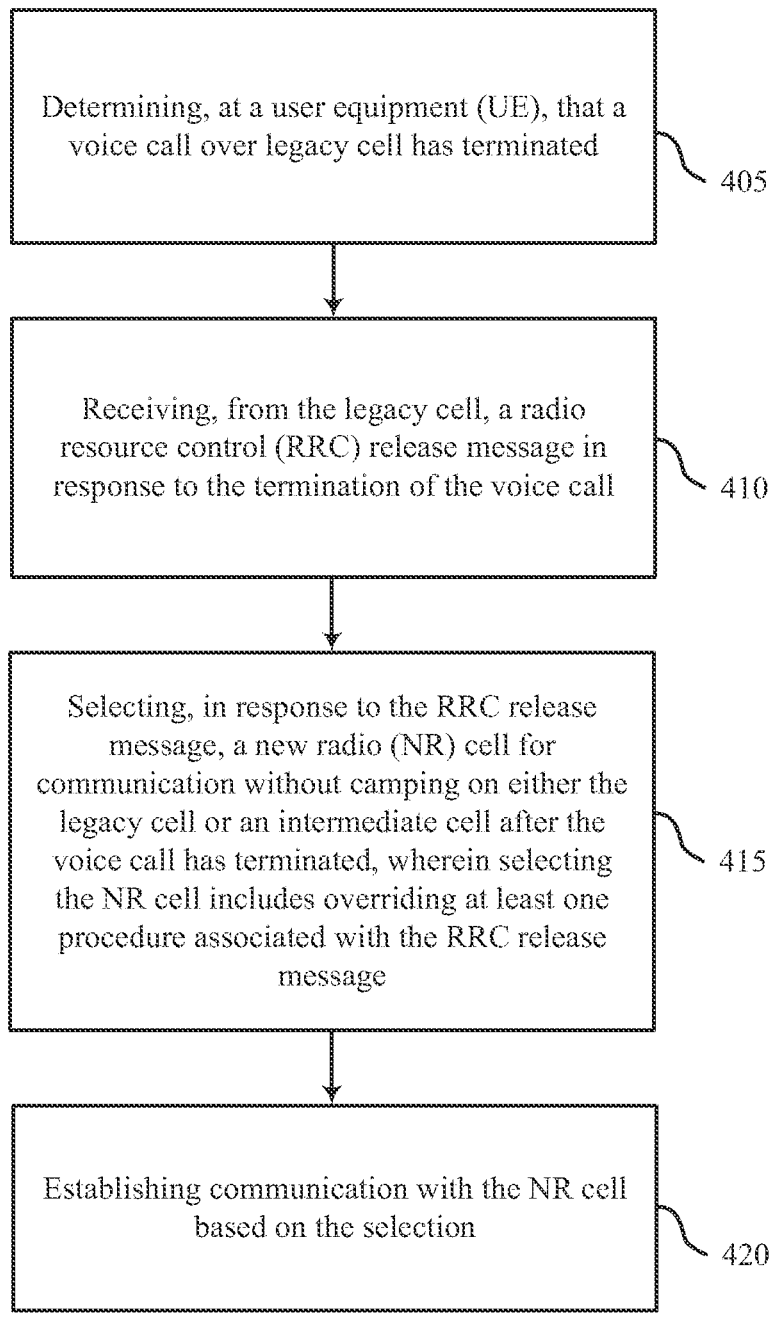
FIG. 4 illustrates an example of a method of wireless communication implemented by the UE in accordance with aspects of the present disclosure.

FIG. 4 is a flowchart of an example method 400 for wireless communications in accordance with aspects of the present disclosure. The method 400 may be performed using the UE 104. Although the method 400 is described below with respect to the elements of the UE 104, other components may be used to implement one or more of the steps described herein.

At block 405, the method 400 may include determining, at a UE, that a voice call over legacy cell has terminated. In some examples, the legacy cell may be one of a UTRAN cell, GSM cell, or a CDMA2000 cell. Aspects of block 405 may be performed by communication management component 350 described with reference to FIG. 3.

At block 410, the method 400 may further include receiving, from the legacy cell, a RRC release message in response to the termination of the voice call. In some examples, the RRC release message may include the RRC release message includes RRC redirection with an E-UTRAN cell information. As noted below, if the RRC redirection information is included, the UE may override the E-UTRAN cell or frequency information included in the RRC release message with a NR cell or frequency information in order to facilitate fast return to the NR. However, in other examples, the RRC release message may release the UE to UTRAN idle state. In such instance, the UE may return to the NR cell based on the fast return policy by skipping the UTRAN idle state to establish communication with the NR cell. In some aspects, the fast return policies may be either preconfigured or provided by the network. Aspects of block 410 may be performed by transceiver 302 as described with reference to FIG. 3.

At block 415, the method 400 may include selecting, in response to the RRC release message, a new radio (NR)) cell for communication without camping on either the legacy cell or an intermediate cell after the voice call has terminated, wherein selecting the NR cell includes overriding at least one procedure associated with the RRC release message. In some examples, the legacy cell may be one of a universal terrestrial radio access network (UTRAN) cell, a global system for mobile communication (GSM) cell or a CDMA2000 cell. Additionally or alternatively, the intermediate cell is an evolved universal terrestrial radio access network (E-UTRAN) cell.

In some examples, with respect to UTRAN where the UE may receive RRC release message that is void of RRC redirect information, the UE may override the at least one procedure associated with the RRC release message by ignoring the procedures associated with the RRC release message that include camping on a UTRAN cell, wherein the UE camping on the UTRAN cell would read UTRAN SIB to identify one or more neighboring E-UTRAN cells. Instead, the UE may measure one or more NR frequencies in lieu of camping on the UTRAN cell or the E-UTRAN cell, and select the NR cell for communication based on measuring the one or more NR frequencies.

In other examples, with respect to GERAN cell and where the UE may receive RRC release message that is void of RRC redirect information, the UE may override the at least one procedure associated with the RRC release message by ignoring at least one procedure associated with the RRC release message that include camping on the GERAN cell, wherein the UE camping on the GERAN cell would read GERAN SIB to identify one or more neighboring E-UTRAN cells. Instead, the UE may directly measure one or more NR frequencies in lieu of camping on the GERAN cell or the E-UTRAN cell, and select the NR cell for communication based on measuring the one or more NR frequencies.

In some examples, however, the RRC release message includes RRC redirection information that comprises one or both of cell or frequency information associated with an E-UTRAN cell. In such situations, overriding the at least one procedure associated with the RRC release message may include analyzing the one or both of the cell or frequency information associated with the E-UTRAN cell to determine whether there is at least one NR cell near the E-UTRAN cell.

In some examples, there may be plurality of available NR cells near the E-UTRAN cell. In such situations, the UE may determine the availability of the plurality of NR cells near the E-UTRAN cell based on analyzing the E-UTRAN cell information, and selecting the NR cell based on priority associated with each of the plurality of NR cells. The selected NR cell may be the highest priority NR cell. In some aspects, the priority information associated with each of the plurality of NR cells may be included in the E-UTRAN cell information.

Additionally or alternatively, overriding the E-UTRAN cell information with NR cell information may include determining that the UE is registered with the NR cell, and overriding the E-UTRAN cell information based on policy or configuration associated with the registration. Specifically, in some situations, the UE may register in NR cell and when a handover to UTRAN cell is due to SRVCC, the UE may establish a local policy or configuration to prior to selecting a NR cell. With respect to the UEs 104 transitioning back from the GSM, at the conclusion of the voice call, the GERAN may move the UE to UTRAN by RRC redirection or CCO. The UE may derive the NR frequency information from target E-UTRAN frequency/cell information provided by the GERAN and identify the NR frequencies and cells from E-UTRAN system information. Accordingly, the UE may override the redirection/CCO and select the NR cell.

In another example, with respect to the transitioning from the GSM back to the NR, the GSM may release the UE to idle state such that UE may skip GERAN camping and select the NR cell directly. Accordingly, the UE may establish communication with the NR cell based on the selection. In some examples, the configuration policy of transitioning may be configured by the NAS or OMA DM or OEM static configuration. The policy may be configured as PLMN specific where the overriding policy for GSM to NR and UTRAN to NR may or may not be different.

The policy in the UE may be sent to the LIE via non-access stratum (NAS) message during registration procedure. The policy information may allow the UE to prior to selecting an NR cell when UE is in UTRAN cell in IDLE mode that is registered and received in NAS message. In some aspects, the policy may also be sent to the UE from the PCC after the UE has registered with the NR cell, or the UE may receive the policy via OMA DM, or be statically configured in the UE. Aspects of block 415 may be performed by parameter overriding component 360 as described with reference to FIG. 3.

At block 420, the method 400 may include establishing communication with the NR cell based on the NR cell configuration information. Aspects of block 420 may be performed by reconfiguration component 355 as described with reference to FIG. 3.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes bath computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method for wireless communications, comprising:
    determining, at a user equipment (UE), that a voice call over a legacy cell has terminated;
    receiving, from the legacy cell, a radio resource control (RRC) release message in response to the termination of the voice call;
    selecting, in response to the RRC release message, a new radio (NR) cell for communication without camping on either the legacy cell or an intermediate cell after the voice call has terminated, wherein selecting the NR cell includes:
        overriding at least one procedure associated with the RRC release message by ignoring the at least one procedure that includes camping on the legacy cell or the intermediate cell and reading a system information block (SIB) to identify one or more neighboring evolved universal terrestrial radio access network (E-UTRAN) cells,
        measuring, by the UE, one or more NR frequencies in lieu of camping on the legacy cell, the intermediate cell, or the one or more E-UTRAN cells and
        selecting the NR cell for communication based on measuring the one or more NR frequencies; and
    establishing communication with the NR cell based on the selection.

2. The method of claim 1, wherein the legacy cell is one of a universal terrestrial radio access network (UTRAN) cell, a global system for mobile communication (GSM) cell or a CDMA2000 cell, and
    wherein the intermediate cell is an evolved universal terrestrial radio access network (E-UTRAN) cell.

3. The method of claim 1, wherein the legacy cell comprises a universal terrestrial radio access network (UTRAN) cell, and the (SIB) comprises a UTRAN SIB, and wherein the at least one procedure associated with the RRC release message that is being ignored includes camping on the UTRAN cell to receive the UTRAN SIB for use in identifying one or more neighboring E-UTRAN cells.

4. The method of claim 1, wherein the legacy cell comprises a global system for mobile communication (GSM) EDGE Radio Access Network (GERAN) cell, and the (SIB) comprises a GERAN SIB, and wherein the at least one procedure associated with the RRC release message that is being ignored includes camping on the GERAN cell to receive the GERAN SIB for use in identifying one or more neighboring evolved universal terrestrial radio access network (E-UTRAN) cells.

5. The method of claim 1, wherein the RRC release message includes RRC redirection information that comprises one or both of cell or frequency information associated with an evolved universal terrestrial radio access network (E-UTRAN) cell.

6. The method of claim 5, wherein overriding the at least one procedure associated with the RRC release message comprises:
    analyzing the one or both of the cell or frequency information associated with the E-UTRAN cell to determine whether there is at least one NR cell near the E-UTRAN cell.

7. The method of claim 6, further comprising:
    selecting the NR cell based on determining that there is at least one NR cell near the E-UTRAN cell.

8. The method of claim 6, further comprising:
determining that there are a plurality of NR cells near the E-UTRAN cell based on analyzing the E-UTRAN cell information; and
selecting the NR cell based on priority associated with each of the plurality of NR cells, wherein the selected NR cell has the highest priority.

9. The method of claim 8, wherein the priority associated with each of the plurality of NR cells is included in a E-UTRAN system information.

10. The method of claim 1, wherein overriding the at least one procedure associated with the RRC release message is based on a policy or configuration information associated with UE.

11. The method of claim 10, wherein the policy or the configuration information association with the UE is received by the UE based on the UE registration with the NR cell by non-access stratum (NAS) message during registration procedure.

12. The method of claim 10, wherein the policy or the configuration information association with the UE is received via Open Mobile Alliance (OMA) Device Management (DM) in the NR cell.

13. The method of claim 10, wherein the policy or the configuration information association with the UE is based on a static configuration.

14. The method of claim 1, wherein the RRC release message is a global system for mobile communications (GSM) enhanced data rates for GSM evolution (EDGE) radio access network (GERAN) release.

15. An apparatus for wireless communications, comprising:
a transceiver;
a memory configured to store instructions;
a processor communicatively coupled with the transceiver and the memory, wherein the processor is configured to execute the instructions to:
determine, at a user equipment (UE), that a voice call over a legacy cell has terminated;
receive, from legacy cell via the transceiver, a radio resource control (RRC) release message in response to the termination of the voice call;
select, in response to the RRC release message, a new radio (NR) cell for communication without camping on either the legacy cell or an intermediate cell after the voice call has terminated, wherein the selection of the NR cell includes:
an override of at least one procedure associated with the RRC release message to ignore the at least one procedure that includes camping on the legacy cell or the intermediate cell and reading a system information block (SIB) to identify one or more neighboring evolved universal terrestrial radio access network (E-UTRAN) cells,
a measure of one or more NR frequencies in lieu of camping on the legacy cell, the intermediate cell, or the one or more E-UTRAN cells and
selecting the NR cell for communication based on measuring the one or more NR frequencies; and
establish, via the transceiver, communication with the NR cell based on the selection.

16. The apparatus of claim 15, wherein the legacy cell is one of a universal terrestrial radio access network (UTRAN) cell, a global system for mobile communication (GSM) cell or a CDMA2000 cell, and
wherein the intermediate cell is an evolved universal terrestrial radio access network (E-UTRAN) cell.

17. The apparatus of claim 15, wherein the legacy cell comprises a universal terrestrial radio access network (UTRAN) cell, and the (SIB) comprises a UTRAN SIB, and wherein the processor configured to execute the instructions to override the at least one procedure associated with the RRC release message further includes instructions to:
ignore at least one procedure the procedures associated with the RRC release message that includes camping on the UTRAN cell to receive the UTRAN SIB for use in identifying one or more neighboring E-UTRAN cells.

18. The apparatus of claim 15, wherein the legacy cell comprises a global system for mobile communication (GSM) EDGE Radio Access Network (GERAN) cell, and the (SIB) comprises a GERAN SIB, and wherein the processor configured to execute the instructions to override the at least one procedure associated with the RRC release message further includes instructions to:
ignore at least one procedure associated with the RRC release message that includes camping on the GERAN cell to receive the GERAN SIB for use in identifying one or more neighboring E-UTRAN cells.

19. The apparatus of claim 15, wherein the RRC release message includes RRC redirection information that comprises one or both of cell or frequency information associated with an evolved universal terrestrial radio access network (E-UTRAN) cell.

20. The apparatus of claim 19, wherein the processor configured to execute the instructions to override the at least one procedure associated with the RRC release message further includes instructions to:
analyze the one or both of the cell or frequency information associated with the E-UTRAN cell to determine whether there is at least one NR cell near the E-UTRAN cell.

21. The apparatus of claim 20, wherein the processor is further configured to execute the instructions to:
select the NR cell based on determining that there is at least one NR cell near the E-UTRAN cell.

22. The apparatus of claim 20, wherein the processor is further configured to execute the instructions to:
determine that there are a plurality of NR cells near the E-UTRAN cell based on analyzing the E-UTRAN cell information; and
select the NR cell based on priority associated with each of the plurality of NR cells, wherein the selected NR cell has the highest priority.

23. The apparatus of claim 22, wherein the priority associated with each of the plurality of NR cells is included in a E-UTRAN system information.

24. The apparatus of claim 15, wherein overriding the at least one procedure associated with the RRC release message is based on a policy or configuration information associated with UE.

25. The apparatus of claim 24, wherein the policy or the configuration information association with the UE is received by the UE based on the UE registration with the NR cell by non-access stratum (NAS) message during registration procedure.

26. The apparatus of claim 24, wherein the policy or the configuration information association with the UE is received via Open Mobile Alliance (OMA) Device Management (DM) in the NR cell.

27. The apparatus of claim 24, wherein the policy or the configuration information association with the UE is based on a static configuration.

28. An article of manufacture, comprising:

a non-transitory computer readable medium having stored therein instructions implementable by one or more processors of a user equipment (UE) to:

determine that a voice call over a legacy cell has terminated;

receive, from the legacy cell, a radio resource control (RRC) release message in response to the termination of the voice call;

select, in response to the RRC release message, a new radio (NR) cell for communication without camping on either the legacy cell or an intermediate cell after the voice call has terminated, wherein the selection of the NR cell includes:

- an override of overriding at least one procedure associated with the RRC release message to ignore the at least one procedure that includes camping on the legacy cell or the intermediate cell and reading a system information block (SIB) to identify one or more neighboring evolved universal terrestrial radio access network (E-UTRAN) cells,
- measuring, by the UE, one or more NR frequencies in lieu of camping on the legacy cell, the intermediate cell, or the one or more E-UTRAN cells and
- selecting the NR cell for communication based on measuring the one or more NR frequencies; and establishing communication with the NR cell based on the selection.

* * * * *